Aug. 3, 1926.
W. HONSBERGER
VEHICLE TIRE
Filed August 28, 1924
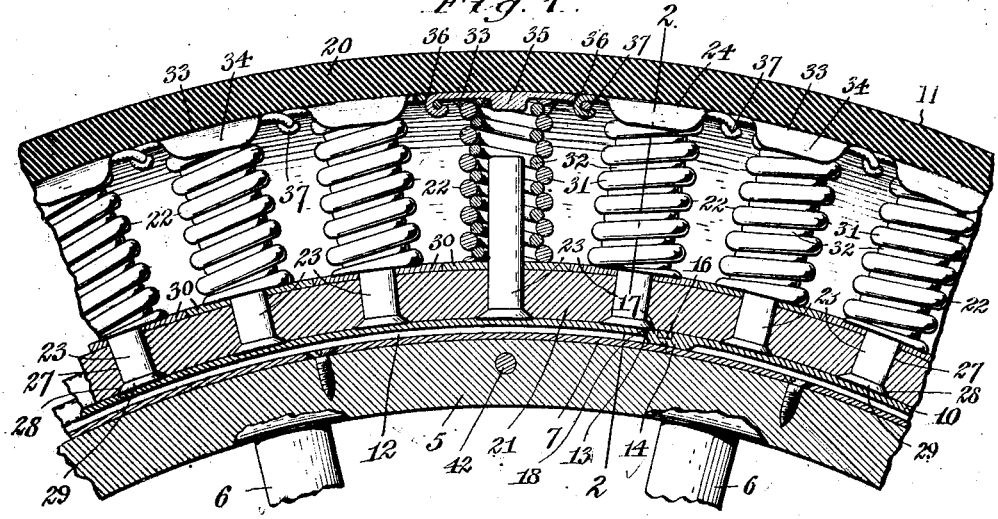
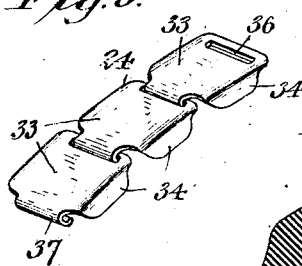
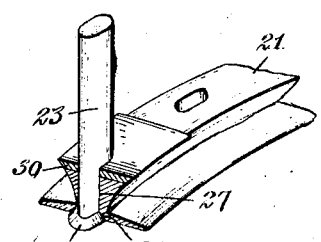
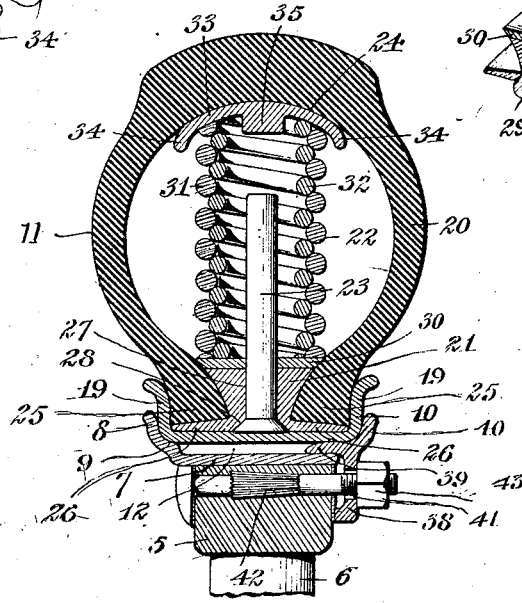
William Honsberger, Inventor.
Witness:
J.J.Oberst, Patented Aug. 3, 1926.

1,594,956

UNITED STATES PATENT OFFICE.

WILLIAM HONSBERGER, OF BUFFALO, NEW YORK.

VEHICLE TIRE.

Application filed August 28, 1924. Serial No. 734,634.

My invention relates to improvements in vehicle tires, and more particularly to that type of tire used on automobiles to provide the necessary resiliency for absorbing shocks and jars imparted to the vehicle when traveling over rough or uneven road surfaces.

One of the objects of my invention is to provide a resilient tire of novel construction in which the conventional outer casing of a pneumatic tire structure is employed without the usual inner air tube, novel means for providing the necessary resiliency being substituted for such air tube.

Another object of my invention is the provision of a resilient tire embodying in its structure radially-disposed spiral springs guided in their movements against buckling and connected at their outer ends by a continuous flexible retainer element consisting of links connected together and having means to retain the outer ends of said springs so as to prevent lateral or circumferential displacement thereof.

A further object of my invention is to provide a resilient tire devoid of air and capable of yielding at points of contact with the road surface, or any projection thereof, or obstruction thereon, independent of the remaining portions of the tire so that the tire will in effect, yield under weight or external pressure in the same manner as a pneumatic tire.

A still further object of my invention is the provision of a resilient tire of novel and simple construction, the parts of which can be easily assembled preparatory to attaching the tire to a wheel, and which can be easily removed from a wheel.

With the above and other objects in view, the invention consists in the novel features of construction and in the arrangement and combination of parts to be hereinafter described and more particularly pointed out in the subjoined claims.

In the drawings:—

Fig. 1 is a circumferential section through a portion of a wheel equipped with my improved tire.

Fig. 2 is a cross section taken on line 2—2, Fig. 1.

Fig. 3 is a fragmentary perspective view of the flexible retainer element whereby the outer ends of the series of springs within the tire are connected together.

Fig. 4 is a sectional perspective view of the annular spring support showing one of the spring retainer and guide pins projecting outwardly therefrom.

In the drawings I have shown my improved tire in connection with one form of automobile wheel, but it will be apparent that the tire is adapted for use on wheels of various constructions.

In the type of wheel shown in the drawings the numeral 5 designates the wheel felloe, connected to the usual radial spokes 6, and having a band 7 encircling the same; said band being provided along its inner marginal portion with a seating and retainer flange 8, the seat of the same being formed at 9 to receive a demountable rim 10 to which the tire 11 is applied.

As is common in wheel constructions, the rim 10 is of greater diameter than the band 7 so that it may be seated on the seat 9 and be maintained in spaced relation to the body portion of the band, the space between the two being designated by the numeral 12. This demountable rim may be of any desired construction and may, for example, be separable circumferentially, as at 13, and for this purpose one end of said rim is increased in thickness to provide an inwardly-projecting transverse rib 14, which bears against the outer surface of the band 7. On the outer surface of the thickened end of said rim, a transverse depression 16 is formed from which a lock lug 17 projects that enters an opening 18 formed in the opposite end of said rim. If desired, however, the ends of the open rim, as it may be termed, may be connected in any other approved manner.

The rim 10 has the usual outstanding flanges 19 at opposite edges thereof, providing for said rim a channeled formation, into the channel of which the tire proper is adapted to be fitted.

The tire includes the usual outer casing or shoe 20 employed in pneumatic tires, and in lieu of the usual inner air tube I have substituted a flexible and yielding mechanical structure which comprises a spring support or supporting ring 21, a series of spiral springs 22, retainer and guide pins 23, and a flexible endless retainer element 24, all combined and co-operating to maintain the casing or shoe 20 in expanded condition. The supporting ring 21 fits between the base portions 25 of the casing or shoe, and is flared outwardly to conform to the curvature of said base portions at their inner sides, and it also has at its inner periphery laterally projecting flanges 26 on which the base portions of the tire rest. Formed in the supporting ring 21 at regular intervals around the same are openings 27, preferably elongated, as clearly shown in Fig. 4, and having their inner ends flared, as at 28.

Fitted into said openings from the inner side of said supporting ring, are the retainer and guide pins 23, which have flared heads 29 adapted to fit the flared inner ends of the openings 27, said pins being of greater dimension in one direction—preferably with reference to the circumference of the supporting ring—than in the other direction, and by reason of the pins being fitted into the elongated openings 27, they are prevented from turning within said ring. These pins are therefore disposed radially around the supporting ring and project a considerable distance from said ring into the casing or shoe 20. Disposed over said pins and bearing against the outer surface of the supporting ring are washers 30 which are preferably elongated and arranged so that the ends of each washer abut against the ends of adjoining washers. Each washer has an elongated opening formed therein to correspond to the shape of the retainer or guide pin over which it is fitted, and the side edges thereof are preferably shaped to conform to the flaring sides of the supporting ring, as clearly shown in Fig. 2, said side edges being in contact with the inner surface of the casing or shoe 20.

The springs 22 preferably comprise two spring members 31, 32, arranged one within the other, the inner spring member 32 being constructed of wire of smaller gage than the outer spring member 31 and being preferably of a diameter to thread into said outer spring member with its convolutions disposed between the convolutions of the outer spring member; such construction providing the necessary resistance against collapse of the shoe or tire under weight or external pressure, and at the same time, the complete spring so formed, occupies comparatively little space within the shoe or casing. A spring is positioned around each retainer or guide pin and bears with its inner end against the washer placed over said pin. With the springs so positioned, they extend outwardly a distance beyond the outer ends of said pins. The flexible endless retainer element 24 comprises a series of links 33 flexibly connected together, each link being curved transversely and having inwardly curved flanges 34 at opposite edges and a boss 35 centrally disposed on its inner side, which is adapted to fit into one of the springs 22. Each link has a transversely-disposed slot 36 at one end thereof and a hook 37 at its other end, the hook of each link being passed through a slot of an adjacent link. The flexible retainer element is placed around the circumferential series of springs with the inner sides of the links thereof bearing against said springs and the bosses of said links fitting into the outer ends of said springs, the circumference of the flexible endless element being such that upon compression of a number of springs, it may be placed around the series of springs and be held in place by the expansive qualities of said springs.

The mechanical structure substituted for the usual air tube and which—as stated, includes the supporting ring 21; springs 22; the pins 23; the retainer element 24, and when used, the washers 30—may be said to form an endless unitary structure when the several parts thereof are assembled, and over this unitary structure the casing or shoe 20 is placed, the tread portion of the casing or shoe bearing against the series of links 33 forming the flexible retainer element, while the base portions of the shoe are seated against the lateral flanges 26 of the supporting ring and bear against opposite sides of said supporting ring, externally of said flanges.

The complete tire thus formed has its base—which includes the base portions of the casing or shoe and the supporting ring—fitted into the demountable rim 10, this being accomplished by inserting the rim with its ends separated into the wheel opening of the tire, then snapping or placing the rim in position against the inner periphery of the tire and locking the ends of the rim. With a tire thus attached to the rim, it is placed upon the wheel in the customary manner; that is, the tire with its rim is positioned over the wheel of the vehicle and the inner angle of the rim seated against the seat 9 formed on the seating or retainer flange 8 of the band 7.

The rim 10 is held in position by retainer clips 38, which may be of the usual construction in which an inwardly-directed lip 39 is forced into the space 12 between the band 7 and the rim 10 and an outwardly-directed retainer lip 40 bears against the rim of the tire at its outer angle and outer side.

As is common in retainer clips of this kind, each clip is provided with a vertically elongated bolt hole 41. Bolts 42 are passed through the felloe of the wheel from the inner side and their outer threaded ends project through the bolt holes of the retainer clips and have securing nuts 43 threaded thereon, which bear against the clips and when tightened force the lips 39 of the clips firmly into the space 12 between the band of the wheel and the rim of the tire and the lips 40 against the outer angle and side of the rim, thus securely fastening the tire to the wheel.

As clearly shown in Fig. 2 of the drawings, the base portions of the casing or shoe are widened inwardly, and by reason of the supporting ring 21 being flared outwardly, the tire will be firmly held between opposite sides of said supporting ring and the inner sides of the outstanding flanges 19 on the rim 10.

By flexibly connecting the outer ends of the series of springs together through the medium of the pivotally connected links 33, any set of three springs may be compressed independently of the remaining springs. Assuming a projection in the road to strike centrally underneath one of the springs, said spring will be compressed to a certain degree while the two adjacent springs will be slightly compressed, and with such slight compression they will be flexed toward the intermediate spring, owing to the longitudinal half of the adjacent springs at one side of the center being subjected to greater pressure than the other longitudinal half of each of said adjacent springs. The action, therefore, of the tire is similar to that of a pneumatic tire, and immediately pressure is relieved from the outside of the casing, the springs will return the same to normal position. Furthermore, by flexibly connecting the outer ends of the springs, the tread portion of the casing or shoe is subjected to substantially equal internal pressure along all points in the circumference thereof. Displacement of the springs is impossible, due to the projecting pins extending partly through the same, said pins being firmly retained in position due to the inner ends thereof being in contact with the outer surface of the rim 10.

With the mechanical structure, or cushioning means, as it may be termed, inserted into the casing or shoe, the tire can be applied to the rim or removed therefrom in exactly the same manner as an ordinary pneumatic tire having an inner air tube therein.

Having thus described my invention, what I claim is:—

1. In a vehicle tire, the combination with a casing and a rim having outstanding flanges, of a ring within said rim having an outwardly-flared portion between which and said outstanding flanges the base portions of said tire are disposed and having also laterally projecting flanges against which said base portions are seated, a series of pins passed through said ring from the inner side and extending outwardly therefrom into said casing, a series of spiral springs, each surrounding the outwardly extending portions of one of said pins, said springs bearing with their inner ends against said ring, and a flexible element surrounding the series of springs and bearing against the inner side of the tread portion of said casing, said flexible element comprising pivotally-connected links having exterior curved surfaces bearing against the inner side of the tread portion of said tire and having the outer ends of said springs bearing against the inner sides of said links.

2. In a vehicle tire, the combination with a casing and a rim having outstanding flanges, of a supporting ring fitting into said rim and having lateral flanges and an outstanding outwardly-flared portion between which and the flanges of said rim the base portions of said casing are adapted to be clamped, said base portions resting against said lateral flanges, a circumferential series of non-circular pins passed through said ring and extending outwardly therefrom into said casing, a circumferential series of spiral springs within said casing, each spring surrounding one of said pins and bearing with its inner end against said ring, a flexible endless spring retainer surrounding said series of springs and comprising pivotally connected links, each link having inwardly-curved portions at opposite edges and a boss on its inner side, the outer end of each of said springs bearing against the inner side of one of said links around the boss thereof.

3. In a vehicle tire, the combination with a casing and a rim having outstanding flanges, of a supporting ring within said rim bearing thereagainst, said supporting ring having an outwardly-flared portion and lateral flanges, the base portions of said tire resting upon said lateral flanges and being clamped between the outwardly-flared portion of said ring and the flanges of said rim, non-circular pins extending through said ring at regular intervals and projecting outwardly therefrom into said casing, a washer surrounding each of said pins and bearing against said ring, the side edges of said washer being flared outwardly to form a continuation of the outwardly-flared portion of said ring and adjoining washers abutting end to end, a spiral spring surrounding each of said pins and bearing with its inner end against one of said washers, and a flexible spring retainer interposed between said springs and the tread portion of said tire.

4. In a vehicle tire, the combination with a casing and a rim having outstanding flanges, of a supporting ring within said rim bearing thereagainst, said supporting ring having an outwardly-flared portion and opposite lateral flanges, the base portions of said tire resting upon said lateral flanges and being clamped between the outwardly-flared portion of said ring and the flanges of said rim, non-circular pins extending through said ring at regular intervals and projecting outwardly therefrom into said casing, a washer surrounding each of said pins and bearing against said ring, the side edges of said washers being flared outwardly to form a continuation of the outwardly-flared portion of said ring, adjoining washers abutting end to end, a spiral spring surrounding each of said pins and bearing with its inner end against one of said washers, and a flexible spring retainer interposed between said springs and the tread portion of said tire and comprising transversely curved links, each having an opening at one end and a hook at its other end adapted to engage the opening of an adjacent link.

5. In a vehicle tire, the combination with a casing and a flanged rim, of a supporting ring bearing against said rim between the flanges thereof and between which and said flanges said casing is clamped, a series of spiral springs surrounding said supporting ring and each comprising two spiral spring members, one threaded into the other and having the convolutions thereof entering the spaces between the convolutions of said other, and a flexible spring retainer interposed between the outer ends of said springs and the tread portion of said casing and bearing against both.

In testimony whereof I affix my signature.

WILLIAM HONSBERGER.